United States Patent
Choi

(10) Patent No.: US 7,988,193 B2
(45) Date of Patent: Aug. 2, 2011

(54) AIRBAG CUSHION FOR DRIVER AND FOLDING METHOD THEREOF

(75) Inventor: Hyeong Ho Choi, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 12/479,502

(22) Filed: Jun. 5, 2009

(65) Prior Publication Data
US 2010/0090446 A1 Apr. 15, 2010

(30) Foreign Application Priority Data
Oct. 14, 2008 (KR) .................. 10-2008-0100702

(51) Int. Cl.
*B60R 21/237* (2006.01)
(52) U.S. Cl. ................... 280/743.1; 280/731; 280/730.1
(58) Field of Classification Search ............... 280/743.1, 280/730.1, 731, 728.1
See application file for complete search history.

(56) References Cited

U.S. PATENT DOCUMENTS

| | | | | |
|---|---|---|---|---|
| 5,253,892 A * | 10/1993 | Satoh | .................. | 280/731 |
| 5,358,273 A * | 10/1994 | Onishi et al. | ................ | 280/743.1 |
| 5,529,339 A * | 6/1996 | Niederman | ................ | 280/743.1 |
| 5,560,648 A * | 10/1996 | Rhule et al. | ................ | 280/731 |
| 5,605,350 A * | 2/1997 | Bates et al. | ................ | 280/743.1 |
| 6,042,144 A * | 3/2000 | Murakami et al. | ............ | 280/732 |
| 6,196,585 B1 * | 3/2001 | Igawa | ................ | 280/743.1 |
| 6,254,130 B1 * | 7/2001 | Jayaraman et al. | ........ | 280/743.2 |
| 6,499,765 B2 * | 12/2002 | Hawthorn et al. | ......... | 280/743.1 |
| 6,692,024 B2 * | 2/2004 | Fischer et al. | ............ | 280/743.1 |
| 7,481,455 B2 * | 1/2009 | Iida et al. | ................ | 280/743.1 |
| 7,631,892 B2 * | 12/2009 | Ishikawa et al. | .......... | 280/743.1 |
| 7,753,406 B2 * | 7/2010 | Guha-Thakurta | .......... | 280/743.1 |
| 7,766,374 B2 * | 8/2010 | Abele et al. | ................ | 280/730.1 |
| 2003/0006597 A1 * | 1/2003 | Fischer et al. | ............ | 280/743.1 |
| 2003/0116947 A1 * | 6/2003 | Yokoyama et al. | ......... | 280/730.2 |
| 2005/0110256 A1 * | 5/2005 | Crookston et al. | ......... | 280/743.1 |
| 2006/0055157 A1 * | 3/2006 | Ishiguro et al. | ............ | 280/731 |
| 2006/0113776 A1 * | 6/2006 | Iida et al. | .................. | 280/731 |
| 2006/0163848 A1 * | 7/2006 | Abe | .............................. | 280/729 |
| 2006/0232050 A1 * | 10/2006 | Kumagai et al. | .......... | 280/730.1 |
| 2007/0246920 A1 * | 10/2007 | Abele et al. | ................ | 280/730.1 |

* cited by examiner

*Primary Examiner* — Paul N Dickson
*Assistant Examiner* — Drew Brown
(74) *Attorney, Agent, or Firm* — Morgan, Lewis & Bockius LLP

(57) ABSTRACT

An airbag cushion for a driver and a folding method thereof. The method of folding an airbag cushion installed inside a cover bracket of a steering wheel includes folding a rear end portion of the airbag cushion at least once towards a bottom surface; folding a front end portion of the airbag cushion at least once towards an upper surface; inserting the folded rear and front portions of the airbag cushion into a space between the upper surface and the bottom surface of the airbag cushion; and folding at least a longitudinal end of the folded airbag cushion at least once. When the airbag cushion deploys, the rear portion of the airbag cushion unfolds towards the inside of the rim portion of the steering wheel and the front portion of the airbag cushion unfolds towards the outside of the rim portion.

17 Claims, 15 Drawing Sheets upwards ←→ downwards downwards ←→ upwards downwards ←→ upwards downwards ⟷ upwards downwards ⟷ upwards downwards ⟷ upwards downwards ←→ upwards downwards ←→ upwards downwards ← → upwards downwards ← → upwards downwards ⟷ upwards

AIRBAG CUSHION FOR DRIVER AND FOLDING METHOD THEREOF

CROSS-REFERENCE TO RELATED APPLICATIONS

The present application claims priority to Korean Patent Application Number 10-2008-0100702 filed Oct. 14, 2008, the entire contents of which application is incorporated herein for all purpose by this reference.

BACKGROUND OF THE INVENTION

1. Field of the Invention

The present invention relates to an airbag cushion for a driver and a folding method thereof, wherein the top portion of the airbag cushion is adapted to deploy towards the inside of the rim portion of the steering wheel in the event of a vehicle collision.

2. Description of Related Art

An airbag device has been normally installed on a steering wheel of a car as a safety device, which is automatically filled with airbag gas and protects a driver from being struck by hard interior objects in case of a collision.

As illustrated in FIG. 13, the airbag device in the related art includes an inflator 1 inwardly inflating the gas to fill the airbag according to a signal transferred from an electronic control unit, a cover bracket 2 in which the inflator 1 is installed, and an airbag cushion 4 installed inside the cover bracket 2 in a folded state. The airbag cushion 4 is equipped with a gas injection hole mounted on a connection hole of the cover bracket 2 by a retainer ring 5.

In the event of a vehicle collision, the electronic control unit senses the vehicle collision through a sensor and then inputs an operational signal to the inflator 1. Consequently, the inflator 1 injects the airbag gas into the airbag cushion so as to fully deploy the airbag cushion.

However, in case of the driver with the seat adjusted to be in close proximity to the steering wheel, there have been some controversial discussions regarding injuring the driver. The driver located close to the airbag cushion may be damaged by it impacting the chest, neck, head, and the like since the inflated airbag expands fast in the direction of the driver and distributes the expansive force over a larger area of the body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag cushion for a driver and a folding method thereof, wherein the driver can be protected from the impact of the airbag cushion being deployed from a steering wheel in the event of a vehicle collision.

A method of folding an airbag cushion installed inside a cover bracket of a steering wheel, may include folding a rear end portion of the airbag cushion at least once towards a bottom surface, folding a front end portion of the airbag cushion at least once towards an upper surface, inserting the folded rear and front portions of the airbag cushion into a space between the upper surface and the bottom surface of the airbag cushion, and folding at least a longitudinal end of the folded airbag cushion at least once, wherein the rear end portion of the airbag cushion is configured to deploy downwards a rim portion of the steering wheel when the airbag cushion is inflated, and the front end portion of the airbag cushion is configured to deploy upwards the rim portion of the steering wheel.

The folding of the rear end portion of the airbag cushion at least once towards the bottom surface continuously may fold the rear end portion of the airbag cushion twice towards the bottom surface so as to cover an upper end of the airbag cushion, and the folding of the front end portion of the airbag cushion at least once towards the upper surface may continuously fold the front end portion of the airbag cushion twice towards the upper surface so as to cover a lower end of the airbag cushion.

In the folding step where the longitudinal end of the airbag cushion is folded at least once, the longitudinal end of the airbag cushion may be folded in a forward direction and the folded longitudinal end of the airbag cushion in a forward direction is folded in a rearward direction.

A horizontal stitch line for restraining upwards deployment of the airbag cushion may extend in a lateral direction of the airbag cushion on a rear portion of the airbag cushion.

A vertical stitch line for promoting upward deployment of the airbag cushion may extend in a vertical direction of the airbag cushion on a front portion of the airbag cushion.

In another aspect of the present invention, an airbag cushion for a driver installed inside a cover bracket of a steering wheel, may include an upper surface and a lower surfaces integrally formed with the upper surface, and direction-biasing member configured to change a movement direction of the airbag cushion to be offset from an upward movement direction while the airbag cushion is deployed.

The direction-biasing member may include a first folded portion formed by the upper and lower surfaces at least once folded in one direction, and a second folded portion formed by the upper and lower surfaces at least once folded in the opposite direction of the first folded portion, wherein the first folded portion is disposed in the rim portion of the steering wheel and near to a rear portion of the rim portion and wherein the second folded portion is disposed in the rim portion of the steering wheel and near to a front portion of the rim portion.

The first folded portion may be configured to be folded in a deployment direction of the airbag so that when the airbag is unfolded the first folded portion is rotated in the opposite direction of the deployment direction of the airbag, and the second folded portion is configured to be folded in the opposite direction of the deployment direction of the airbag so that when the airbag is unfolded the second folded portion is rotated in the direction of the deployment direction of the airbag, wherein, when the airbag cushion is inflated, the first folded portion of the airbag cushion is configured to be deployed downwards a rim portion of the steering wheel and the second folded portion of the airbag cushion is configured to be deployed upwards the rim portion of the steering wheel.

In further another aspect of the present invention, the airbag cushion for a driver may further includes a deployment delay member configured to delay a deployment of the first folded portion of the airbag cushion for a predetermined time period wherein the deployment delay member includes a horizontal stitch line connecting the upper and bottom surfaces and extending in a lateral direction for restraining upwards deployment of the airbag cushion.

In still further another aspect of the present invention, the airbag cushion for a driver may further includes a vertical stitch line extending in a vertical direction for promoting upward deployment of the airbag cushion.

In another aspect of the present invention, the airbag cushion for a driver installed inside a cover bracket of a steering wheel, may include a first rear folded line on which a rear end portion of the airbag cushion is folded towards a bottom surface of the airbag cushion, a second rear folded line on which the rear end portion of the airbag cushion already folded towards the bottom surface is inserted into a space between the upper surface and the bottom surface of the airbag cushion in order to cover a rear end of the airbag cushion, a first front folded line on which a front end portion of the airbag cushion is folded towards the upper surface of the airbag cushion, a second front folded line where the front end portion of the airbag cushion already folded towards the upper surface is inserted into the space between the upper surface and the bottom surface of the airbag cushion in order to cover a front end of the airbag cushion, and a vertical folded portion on which a longitudinal end of the airbag cushion is folded.

When the airbag cushion is inflated, the rear end portion of the airbag cushion may deploy towards the bottom surface of the rim portion with unfolding of the first rear folded line and the second rear folded line, and the front end portion of the airbag cushion may deploy in an upward direction of the rim portion with unfolding of the first front folded line and the second front folded line, wherein the vertical folded portion includes a first vertical folded portion on which the longitudinal end of the airbag cushion is folded towards the bottom surface of the airbag cushion and a second vertical folded portion on which the first vertical folded portion is folded towards the upper surface of the airbag cushion.

The airbag cushion for a driver may further include a horizontal stitch line extending in a lateral direction for restraining upwards deployment of the airbag cushion, and a vertical stitch line extending in a vertical direction for promoting forward deployment of the airbag cushion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1A:
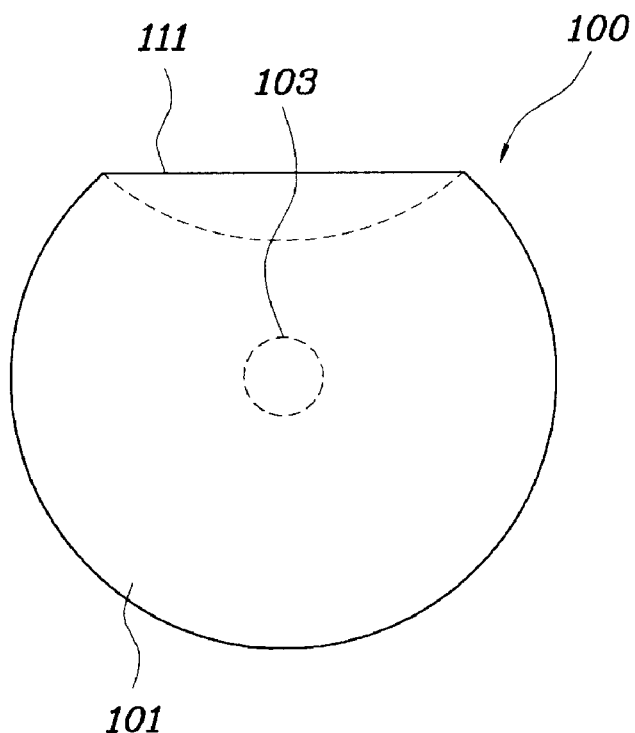
FIGS. 1A, 2A, 3A, 4A, 5A, 6A, 7A and 8A are top views showing a folding process of an exemplary airbag cushion in accordance with the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 1 to 8, an airbag cushion and a folding method thereof according to various exemplary embodiments of the present invention are more clearly characterized by protecting a driver seated in close proximity to a steering wheel from an impact force of the airbag cushion deploying from the steering wheel because the rear portion of the airbag cushion 100 is controlled to deploy towards the inside (in the downward direction) of the rim portion 200 of the steering wheel and the front portion of the airbag cushion 100 to deploy towards the outside (in an upward direction) of the rim portion 200 because of the folding structure of the airbag cushion 100, which is installed inside the cover bracket 300 in a folded state.

In the accompanying drawings, the side of the airbag cushion 100 is referred to as the upper surface 101 and the opposite side thereof is referred to as the bottom surface 102 with respect to the steering wheel for the sake of convenient description. With respect to the steering wheel, the direction toward the head of vehicle will be referred to as a rearward direction and the direction toward the driver will be referred to as a forward direction.

Now, in the structure for realizing the above described characteristics, the airbag cushion 100 is a device installed inside the cover bracket 300 of the steering wheel in a folded state. The airbag cushion 100 is supplied with high pressurized airbag gas through a gas hole 103 from an inflator 400 and can maintain a predetermined shape by a tether while it is being unfolded. Here, since the structures of the airbag cushion 100, the cover bracket 300, the inflator 400, the tether and the like, installed in the steering wheel, are substantially the same as or similar to the structures of an airbag cushion, a cover bracket, an inflator, a tether and the like, installed in an airbag device of the related art, detailed description thereof will be omitted.

The differences may be that first/second rear folded lines 111 and 112 folded in a forward direction of the airbag cushion 100 are separately formed on the rear portion of the airbag cushion 100 in accordance with various embodiments of the present invention. The first rear folded line 111 is a folded line where the rear end portion of the airbag cushion 100 is folded downwards and in a forward direction and is formed horizontally in the lateral direction on the rear portion of the airbag cushion 100 as shown in FIG. 1A.

Figure 2A:
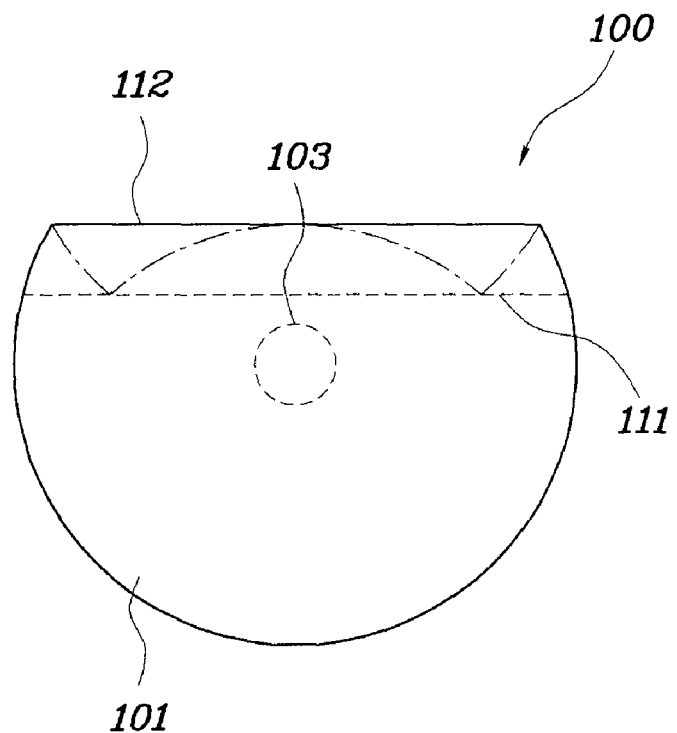

The second rear folded line 112 is a folded line where the rear portion of the airbag cushion 100 is folded downwards and in the forward direction to cover the folded portion of the first rear folded line 111 as shown in FIG. 2A. That is to say, in the state where the rear potion of the airbag cushion 100 is folded in the forward direction with respect to the first rear folded line 111, the rear portion of the airbag cushion 100 is folded again in a forward direction. The first and second rear folded lines 111 and 112 in the folded state are inserted into a space between the upper surface 101 and the bottom surface 102 of the airbag cushion 100.

First/second front folded lines 121 and 122 folded upwards and then in a rearward direction of the airbag cushion 100 are separately formed on the front portion of the airbag cushion 100. The first front folded line 121 is a folded line where the front end portion of the airbag cushion 100 is folded upwards and then in a rearward direction with respect to the first front folded line 121 and is formed horizontally in the lateral direction on the front portion of the airbag cushion 100.

The second front folded line 122 is a folded line where the front portion of the airbag cushion 100 folded with respect to the first front folded line 121 is folded again upward and in the rearward direction to cover the folded portion of the first front folded line 121. In the state where the front portion of the airbag cushion 100 is folded in a rearward direction, the front portion of the airbag cushion 100 is folded again upwards and then in a rearward direction. The first and second front folded lines 121 and 122 in the folded state are inserted into a space between the upper surface 101 and the bottom surface 102 of the airbag cushion 100.

The airbag cushion 100 is provided on sides thereof with vertical folded portions 130 for folding longitudinal end portions of the airbag cushion 100 in the state folded by the rear folded line and the front folded line. The vertical folded portions 130 are folding lines on which the airbag cushion 100 is folded in the horizontal direction, and which include a first vertical folded portion 131 on which the longitudinal end of the airbag cushion 100 is folded downwards and in an inward direction of the airbag cushion 100 and a second vertical folded portion 132 on which the first vertical folded portion 131 is folded upwards and in inward direction of the airbag cushion 100.

Like this, the airbag cushion 100 folded up and down by the rear and front folded lines can be folded in the lateral direction by the first and second vertical folded portions 131 and 132. When the airbag cushion 100 folded in this manner is inflated in the event of a vehicle collision, the rear end portion of the airbag cushion 100 can be deployed in a downward direction of the rim portion 200 of the steering wheel with the unfolding of the rear folded line, and the front end portion of the airbag cushion 100 can be deployed in an upward direction of the rim portion 200 of the steering wheel with the unfolding of the front folded lines.

A folding process of the airbag cushion according to various embodiment of the present invention constructed as above will be described below.

Figure 1B:
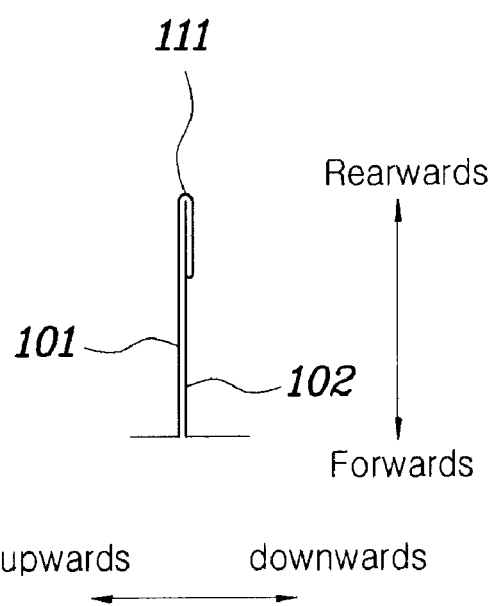
FIGS. 1B, 2B, 3B, 4B, 5B, 6B, 7B and 8B are side elevation views showing the folded states of the exemplary airbag cushion, which correspond to FIGS. 1A, 2A, 3A, 4A, 5A, 6A, 7A and 8A, respectively.

As shown in FIGS. 1A and 1B, the rear end portion of the airbag cushion 100 is folded downwards and in a forward direction with respect to the first rear folded line 111.

Figure 2B:
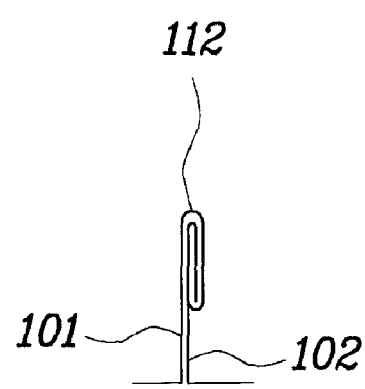

Next, as shown in FIGS. 2A and 2B, the folded rear portion of the airbag cushion 100 is folded again downward and in a forward direction with respect to the second rear folded line 112. In various embodiments of the present invention, the rear end portion of the airbag cushion 100 is folded in a forward direction assuming a shape in which the first rear folded line 111 is covered with the second rear folded line 112, and the length folded by the first rear folded line 111 can be equivalent to the length folded by the second rear folded line 113.

Figure 3A:
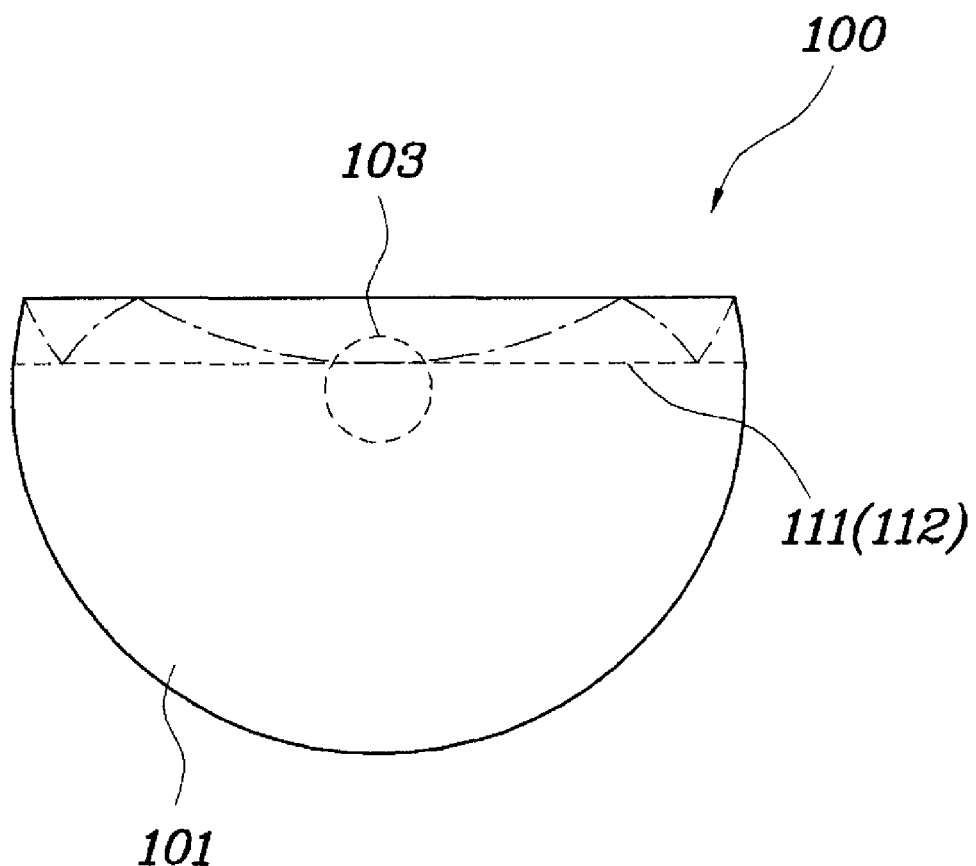
Figure 3B:
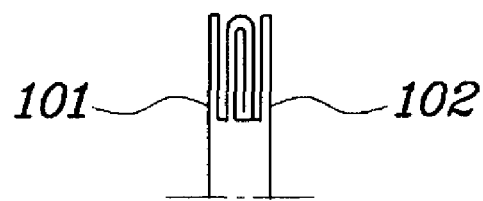

As shown in FIGS. 3A and 3B, when the second rear folded line 112 is folded up, the folded portion is inserted into the space between the upper surface 101 and the bottom surface 102 of the airbag cushion 100. With this, the airbag cushion 100 deployable in a rearward direction of the steering wheel is folded up between the upper surface 101 and the bottom surface 102 of the rear portion of the airbag cushion 100.

Figure 4A:
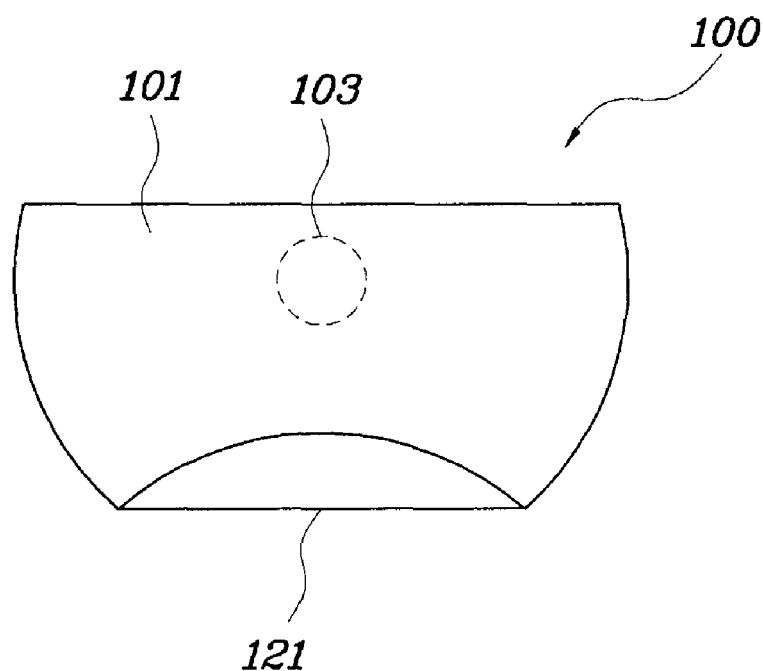
Figure 4B:
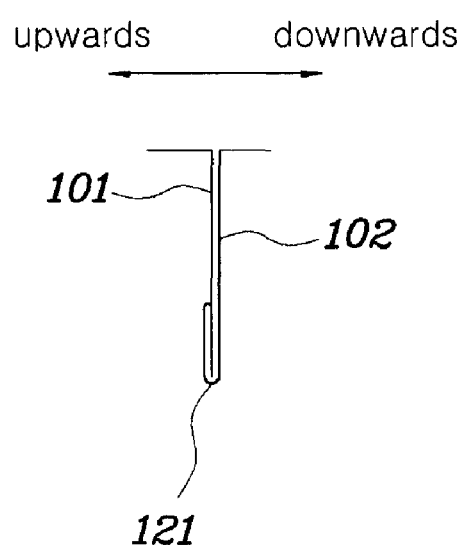

As shown in FIGS. 4A and 4B, the front end portion of the airbag cushion 100 is folded upwards and then in a rearward direction of the airbag cushion 100 with respect to the first front folded line 121.

Figure 5A:
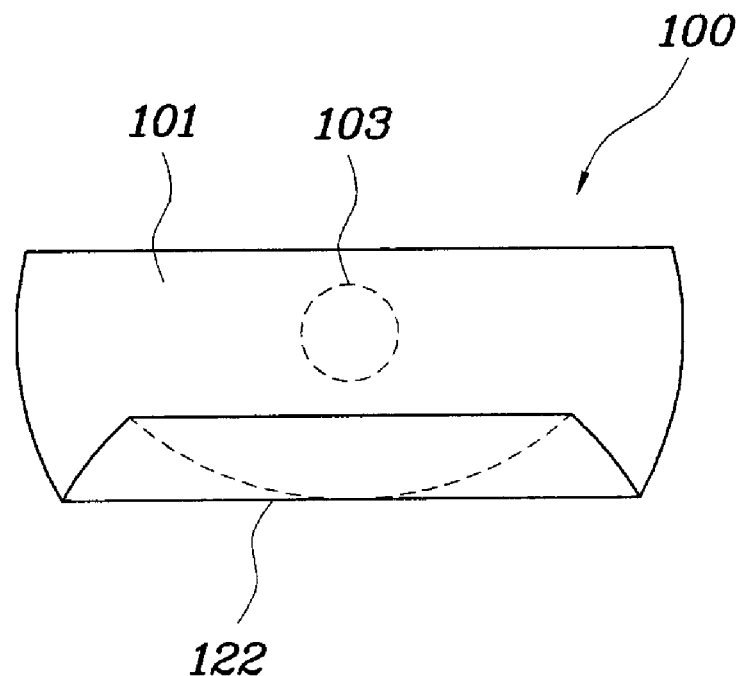
Figure 5B:
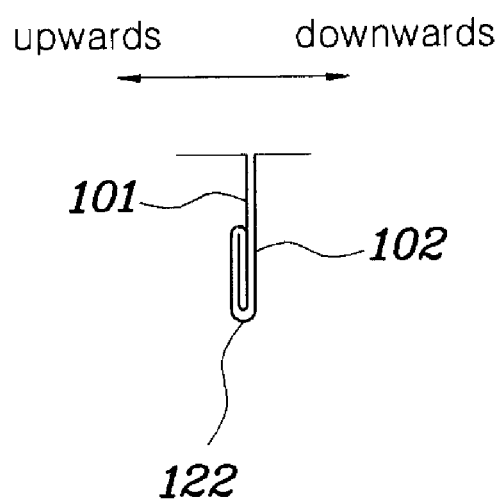

As shown in FIGS. 5A and 5B, the front end portion of the airbag cushion 100 is folded again upwards and then in a rearward direction with respect to the second front folded line 122. In various embodiments of the present invention, the front end portion of the airbag cushion 100 is folded in a rearward direction assuming a shape in which the first front folded line 121 is covered with the second front folded line 122, and the length folded by the first front folded line 121 can be equivalent to the length folded by the second front folded line 122.

Figure 6A:
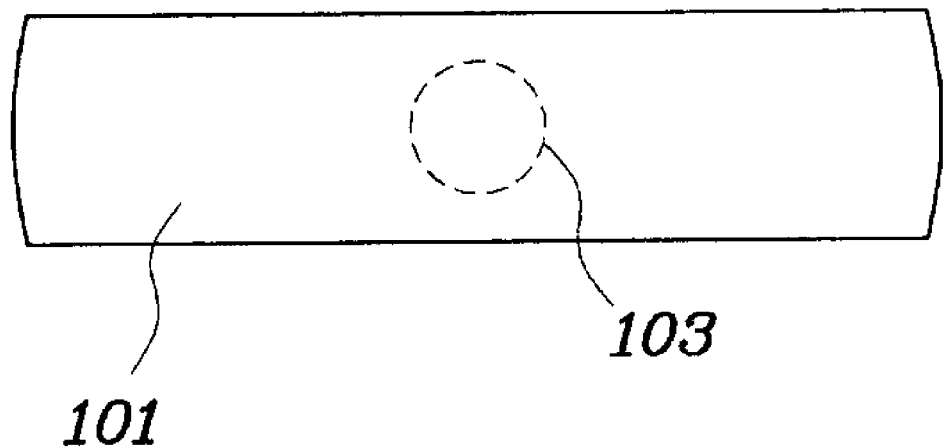
Figure 6B:
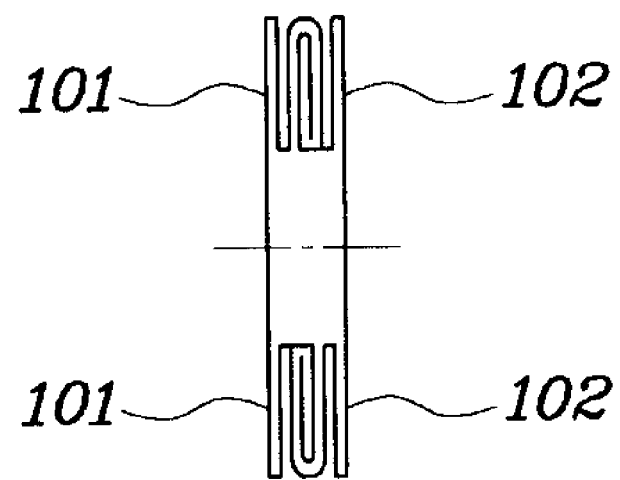

As shown in FIGS. 6A and 6B, when the second front folded line 122 is folded up, the folded portion is inserted into the space between the upper surface 101 and the bottom surface 102 of the airbag cushion 100. With this, the airbag cushion 100 deployable in a forward direction of the steering wheel is folded up between the upper surface 101 and the bottom surface 102 of the front portion of the airbag cushion 100.

Figure 7A:
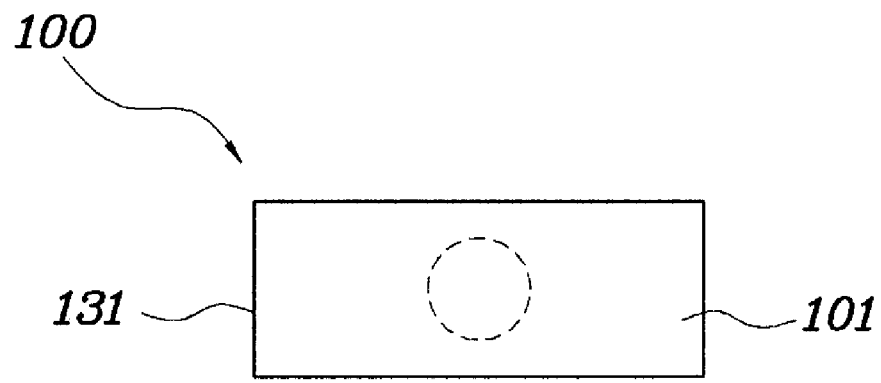
Figure 7B:
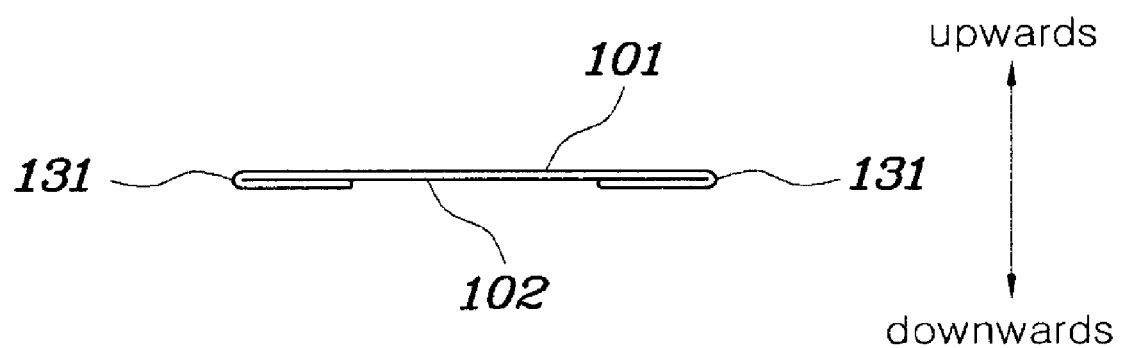

As shown in FIGS. 7A and 7B, after the front and rear end portions of the airbag cushion 100 are inserted into the space between the upper surface 101 and the bottom surface 102 of the airbag cushion 100, the longitudinal end of the airbag cushion 100 is folded downwards and inwards the airbag cushion 100 with respect to the first vertical folded portion 131.

Figure 8A:
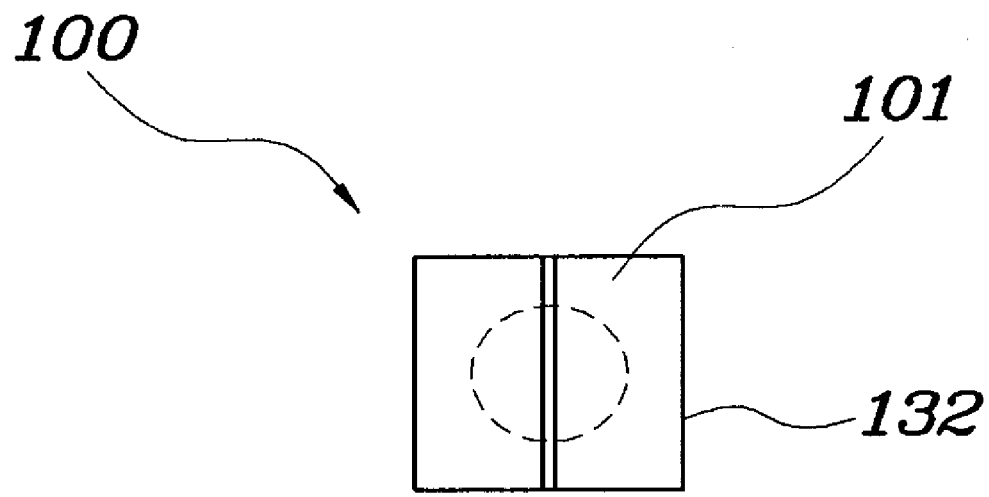
Figure 8B:
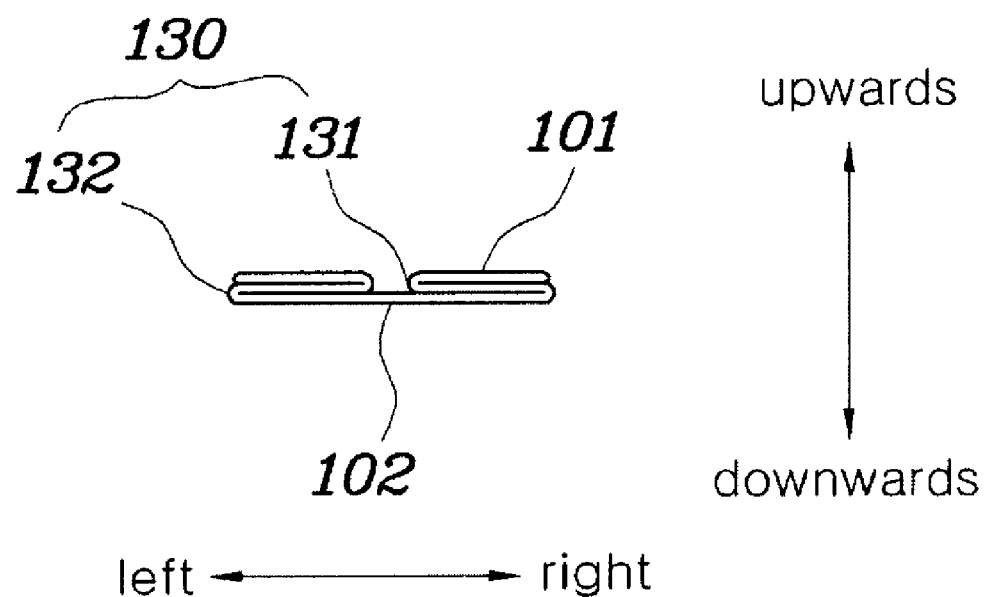

Thereafter, as shown in FIGS. 8A and 8B, the folded longitudinal end of the airbag cushion 100 is folded again upwards and inwards with respect to the second vertical folded portion 132 to face each other. At this time, the length folded in a downward and inward direction with respect to the first vertical folded portion 131 can be equivalent to the length folded in an upward and inward direction with respect to the second vertical folded portion 132.

Figure 9:
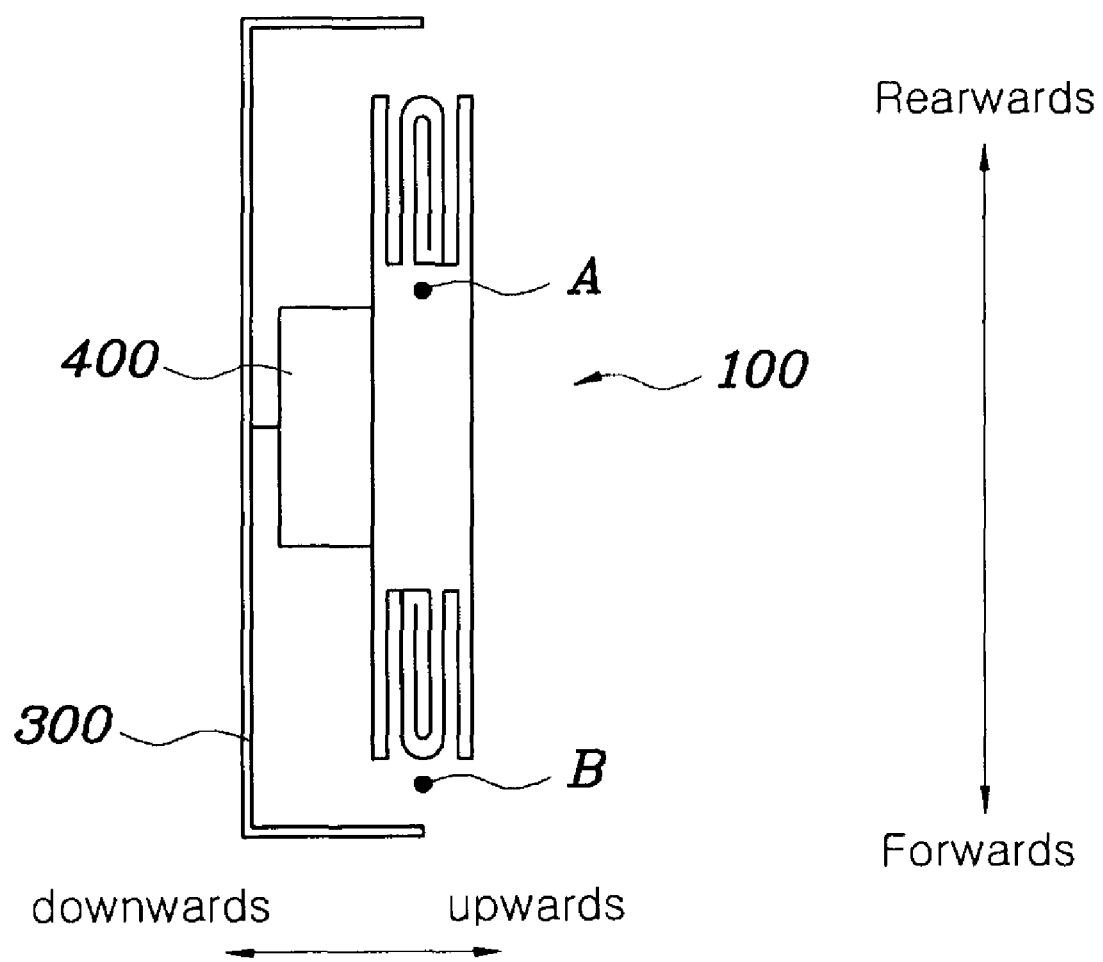
FIG. 9 is a configuration view showing the folding structure of the exemplary airbag cushion in accordance with the present invention.

After all, as shown in FIG. 9, both the rear portion of the airbag cushion 100 deployable in a rearward direction of the steering wheel and the front portion of the airbag cushion 100 deployable in a forward direction of the steering wheel are folded inside the cover bracket 300 of the steering wheel.

A deployment process of the airbag cushion folded like this will be briefly described below.

Figure 10A:
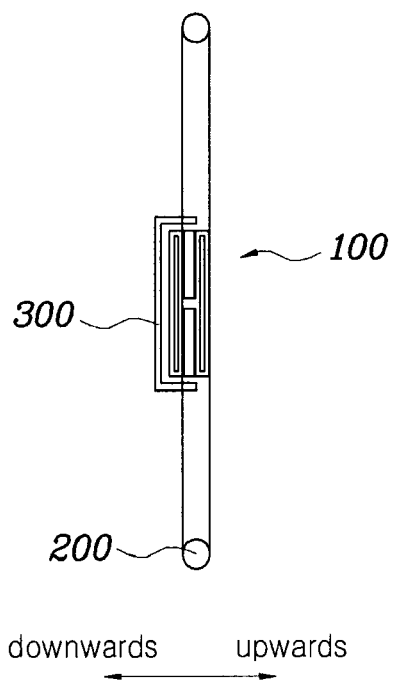
FIGS. 10A to 10E are state views showing an unfolding process of the exemplary airbag cushion in accordance with the present invention.
Figure 10B:
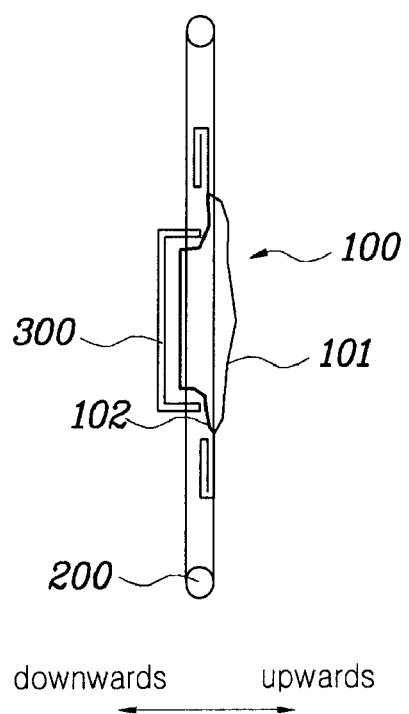

As shown in FIGS. 10A and 10B, when the airbag cushion 100 starts deploying from the folded state inside the cover bracket 300 of the steering wheel, the front and rear end portions of the airbag cushion 100 break away from the space between the upper surface 101 and the bottom surface 102 of the airbag cushion 100, respectively.

Figure 10C:
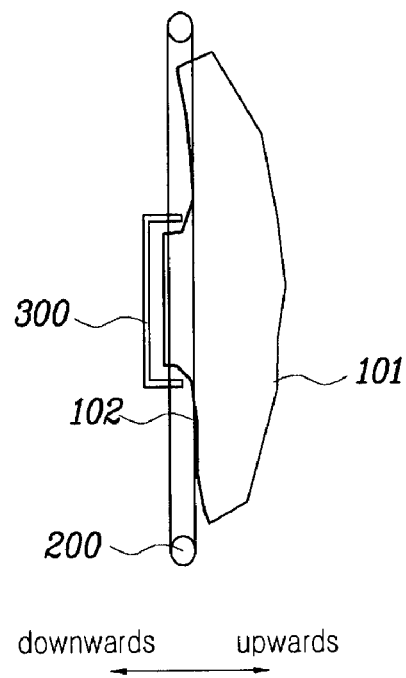
Figure 10D:
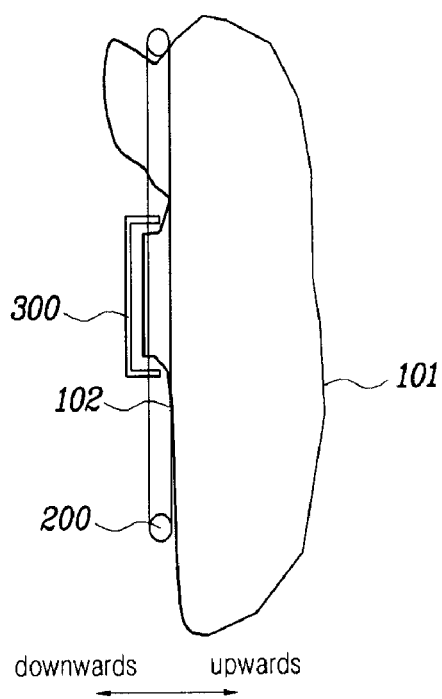
Figure 10E:
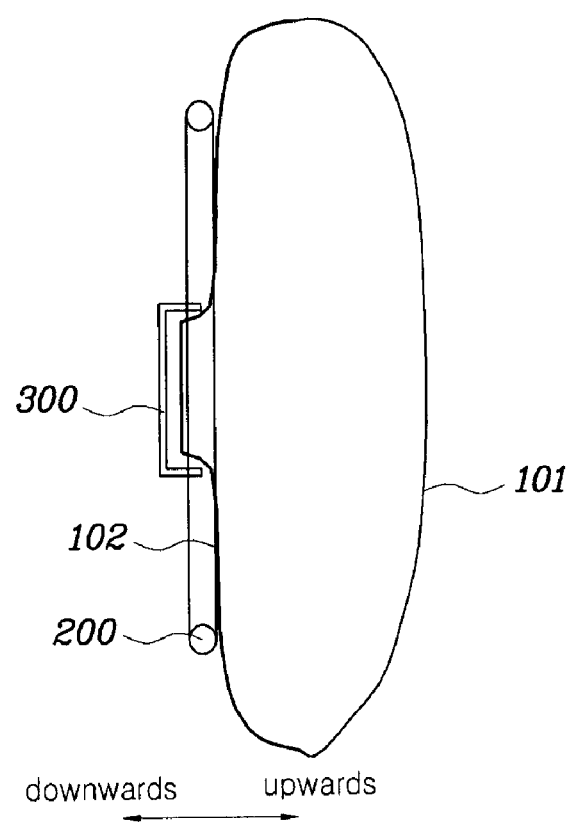

As shown in FIGS. 10C through 10E, after breaking away from the space between the upper surface 101 and the bottom surface 102 as mentioned above, the rear end portion of the airbag cushion deploys under the rim portion 200 of the steering wheel along the folded direction and the front end portion deploys above the rim portion 200 of the steering wheel along the folded direction. With this, the driver seated in close proximity to the steering wheel can be protected from an impact of the airbag cushion 100 deploying from the steering wheel.

In detail, the rear portion of the airbag cushion 100 includes a hinge point "A" and the front portion of the airbag cushion 100 includes a hinge point "B." As the airbag cushion 100 is deployed, the upper surface 101 is also deployed. However, since the length between the hinge point A and the top portion of the upper surface 101 is shorter than the length between the hinge point B and the top portion of the upper surface 101, the rear portion of the airbag cushion 100 rotates in a counter-clockwise direction but the front portion of the airbag cushion 100 deploys in a transitional direction.

Figure 11:
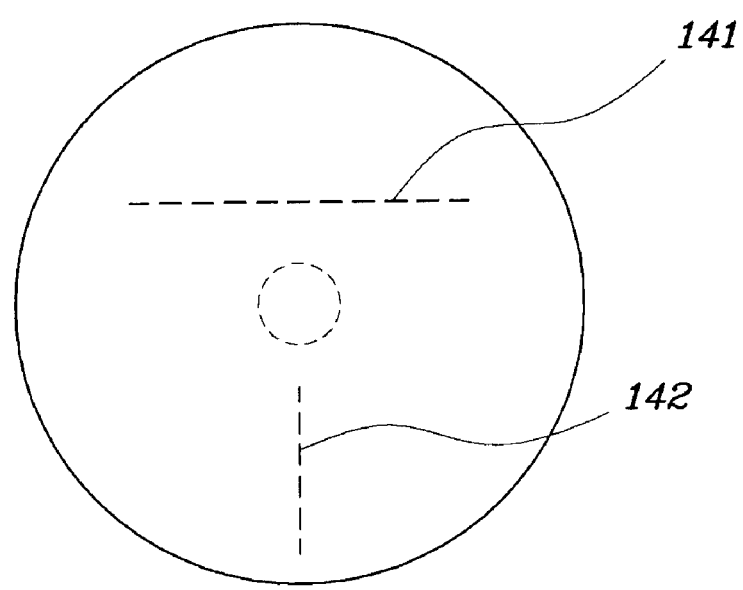
FIG. 11 is a front elevation view showing an exemplary airbag cushion in accordance with the present invention.

As shown in FIG. 11, a horizontal stitch line 141 along which the upper surface 101 and the bottom surface 102 of the airbag cushion 100 are sewn together in the lateral direction can be extended on the rear portion of the airbag cushion 100, and a vertical stitch line 142 along which the upper surface 101 and the bottom surface 102 of the airbag cushion 100 are sewn together in the traverse direction can be formed extending on the front portion of the airbag cushion 100.

Since the horizontal stitch line 141 connects the upper surface 101 and the bottom surface 102 of the rear portion of the airbag cushion 100 in the lateral direction mutually under a predetermined pressure of the airbag gas when the airbag cushion is inflated, the horizontal stitch line 141 plays the role of restraining the deployment of the front portion of the airbag cushion 100 for a certain period of time. When the pressure of the airbag gas rises over a predetermined pressure limit, the horizontal stitch line 141 is torn apart and the deployment of the front portion of the airbag cushion 100 is smoothly performed.

Similarly, since the vertical stitch line 142 mutually connects the upper surface 101 and the bottom surface 102 of the front portion of the airbag cushion 100 in the traverse direction when the airbag cushion is inflated, the vertical stitch line 142 plays a role to promote the upward and forward deployment of the airbag cushion 100.

The deployment procedure of the airbag cushion having the horizontal stitch line and the vertical stitch line will be briefly described below.

Figure 12A:
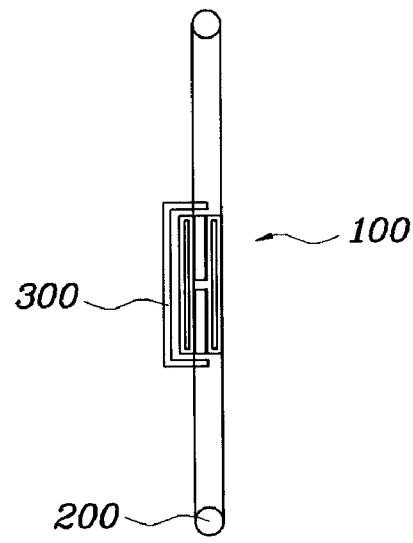
FIGS. 12A to 12E are state views showing an unfolding process of the exemplary airbag cushion in accordance with the present invention.
Figure 12B:
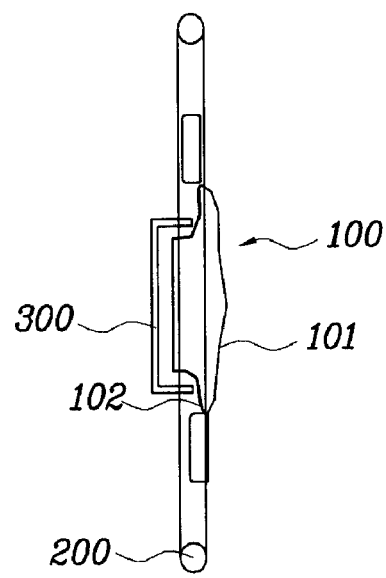

As shown in FIGS. 12A and 12B, when the airbag cushion 100 starts deploying from the folded state inside the cover bracket 300 of the steering wheel, the front and rear end portions of the airbag cushion 100 break away from the space between the upper surface 101 and the bottom surface 102 of the airbag cushion 100, respectively.

Figure 12C:
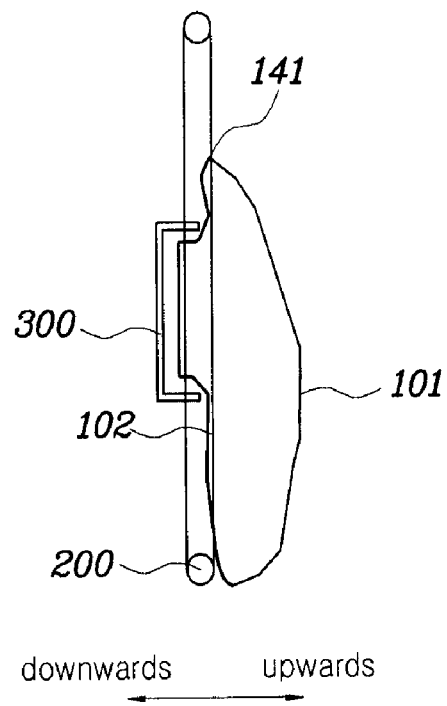
Figure 12D:
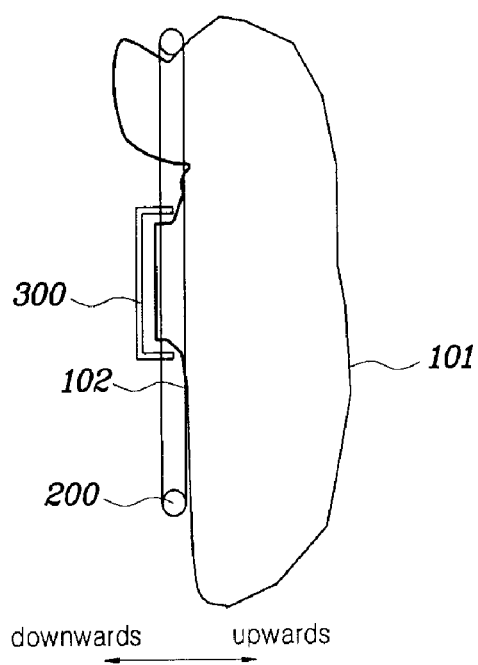

As shown in FIGS. 12C and 12D, after breaking away from the space between the upper surface 101 and the bottom surface 102 as mentioned above, the rear end portion of the airbag cushion deploys under the rim portion 200 of the steering wheel according to the folded direction and the front end portion deploys above the steering wheel. At this time, the deployment of the rear end portion of the airbag cushion 100 can be restrained for a certain period of time due to the interference of the horizontal stitch line 141.

Figure 12E:
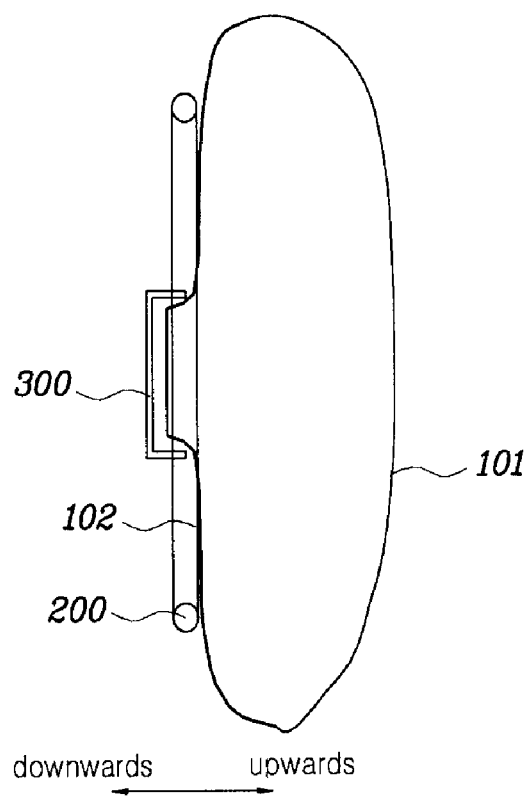
Figure 13:
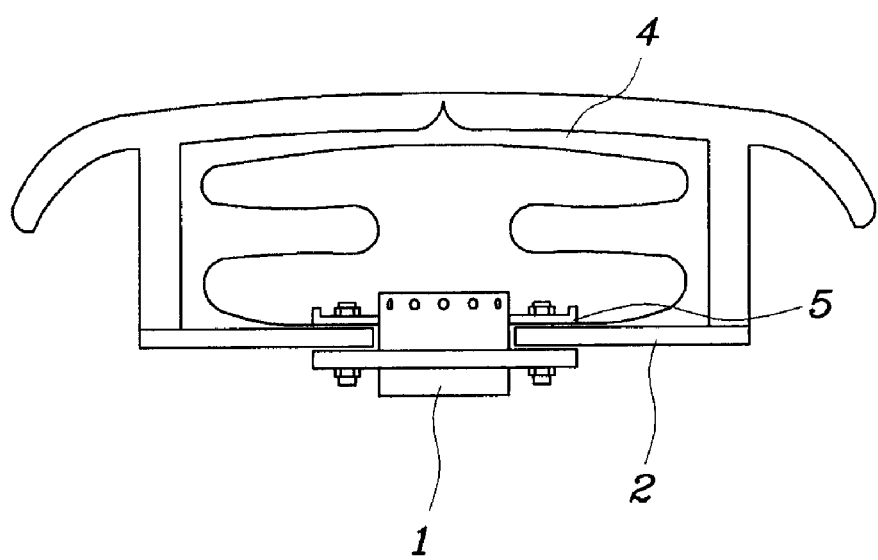
FIG. 13 is a configuration diagram of an airbag device of the related art.

As shown in FIG. 12E, when the pressure of the airbag gas reaches or exceeds the limit the horizontal stitch line 141 is torn apart and the rear end portion of the airbag cushion 100 can be smoothly deployed. Since the rear end portion of the airbag cushion 100 strikes first the rim portion 200 of the steering wheel while the airbag cushion 100 is inflating, the airbag cushion 100 does not provide any direct impact on the passenger's head and neck, thereby protecting the passenger from the deployment of the airbag cushion 100.

For convenience in explanation and accurate definition in the appended claims, the terms "upper", "downwards", "lower", "front", "rear", "back", "upwards" and "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A method of folding an airbag cushion installed inside a cover bracket of a steering wheel, comprising:
    folding a rear end portion of the airbag cushion at least once towards a bottom surface;
    folding a front end portion of the airbag cushion at least once towards an upper surface;
    inserting the folded rear and front portions of the airbag cushion into a space between the upper surface and the bottom surface of the airbag cushion; and
    folding at least a longitudinal end of the folded airbag cushion at least once.

2. The folding method of an airbag cushion in accordance with claim 1, wherein the rear end portion of the airbag cushion is configured to deploy downwards of a rim portion of the steering wheel when the airbag cushion is inflated, and the front end portion of the airbag cushion is configured to deploy upwards of the rim portion of the steering wheel.

3. The folding method of an airbag cushion in accordance with claim 2, wherein the folding of the rear end portion of the airbag cushion at least once towards the bottom surface continuously folds the rear end portion of the airbag cushion twice towards the bottom surface so as to cover an upper end of the airbag cushion, and
    wherein the folding of the front end portion of the airbag cushion at least once towards the upper surface continuously folds the front end portion of the airbag cushion twice towards the upper surface so as to cover a lower end of the airbag cushion.

4. The folding method of an airbag cushion in accordance with claim 2, wherein in the folding step where the longitudinal end of the airbag cushion is folded at least once, the longitudinal end of the airbag cushion is folded downwards and inwards and the folded longitudinal end of the airbag cushion is folded upwards and inwards.

5. The folding method of an airbag cushion in accordance with claim 2, wherein a horizontal stitch line for restraining upwards deployment of the airbag cushion extends in a lateral direction of the airbag cushion on an rear portion of the airbag cushion.

6. The folding method of an airbag cushion in accordance with claim 2, wherein a vertical stitch line for promoting upward deployment of the airbag cushion extends in a vertical direction of the airbag cushion on a front portion of the airbag cushion.

7. An airbag cushion for a driver installed inside a cover bracket of a steering wheel, comprising:
    an upper surface and a lower surface integrally formed with the upper surface; and
    a direction-biasing portion configured to change a movement direction of the airbag cushion to be offset from an upward movement direction while the airbag cushion is deployed,
    wherein the direction-biasing portion includes:
        a first folded portion formed by the upper and lower surfaces at least once folded in one direction; and
        a second folded portion formed by the upper and lower surfaces at least once folded in the opposite direction of the first folded portion;
    wherein the first folded portion is configured to be folded in a deployment direction of the airbag so that when the airbag is unfolded the first folded portion is rotated in the opposite direction of the deployment direction of the airbag, and the second folded portion is configured to be folded in the opposite direction of the deployment direction of the airbag so that when the airbag is unfolded the second folded portion is rotated in the direction of the deployment direction of the airbag.

8. The airbag cushion for a driver in accordance with claim 7, wherein the first folded portion is disposed in the rim portion of the steering wheel and near to a rear portion of the rim portion.

9. The airbag cushion for a driver in accordance with claim 7, wherein the second folded portion is disposed in the rim portion of the steering wheel and near to a front portion of the rim portion.

10. The airbag cushion for a driver in accordance with claim 7, wherein, when the airbag cushion is inflated, the first folded portion of the airbag cushion is configured to be deployed downwards a rim portion of the steering wheel and the second folded portion of the airbag cushion is configured to be deployed upwards the rim portion of the steering wheel.

11. The airbag cushion for a driver in accordance with claim 7, further comprising a deployment delay member configured to delay a deployment of the first folded portion of the airbag cushion for a predetermined time period.

12. The airbag cushion for a driver in accordance with claim 11, wherein the deployment delay member includes a horizontal stitch line connecting the upper and bottom surfaces and extending in a lateral direction for restraining upwards deployment of the airbag cushion.

13. The airbag cushion for a driver in accordance with claim 7, further comprising a vertical stitch line extending in a vertical direction for promoting upward deployment of the airbag cushion.

14. An airbag cushion for a driver installed inside a cover bracket of a steering wheel, comprising:
　a first rear folded line on which a rear end portion of the airbag cushion is folded towards a bottom surface of the airbag cushion;
　a second rear folded line on which the rear end portion of the airbag cushion already folded towards the bottom surface is inserted into a space between the upper surface and the bottom surface of the airbag cushion in order to cover a rear end of the airbag cushion;
　a first front folded line on which a front end portion of the airbag cushion is folded towards the upper surface of the airbag cushion;
　a second front folded line where the front end portion of the airbag cushion already folded towards the upper surface is inserted into the space between the upper surface and the bottom surface of the airbag cushion in order to cover a front end of the airbag cushion; and
　a vertical folded portion on which a longitudinal end of the airbag cushion is folded.

15. The airbag cushion for a driver in accordance with claim 14, wherein, when the airbag cushion is inflated, the rear end portion of the airbag cushion deploys towards the bottom surface of a rim portion of the steering wheel with unfolding of the first rear folded line and the second rear folded line, and the front end portion of the airbag cushion deploys in an upward direction of the rim portion of the steering wheel with unfolding of the first front folded line and the second front folded line.

16. The airbag cushion for a driver in accordance with claim 14, wherein the vertical folded portion includes a first vertical folded portion on which the longitudinal end of the airbag cushion is folded towards the bottom surface of the airbag cushion and a second vertical folded portion on which the first vertical folded portion is folded towards the upper surface of the airbag cushion.

17. The airbag cushion for a driver in accordance with claim 14, further comprising:
　a horizontal stitch line extending in a lateral direction for restraining upwards deployment of the airbag cushion; and
　a vertical stitch line extending in a vertical direction for promoting forward deployment of the airbag cushion.

* * * * *